United States Patent Office 3,714,289
Patented Jan. 30, 1973

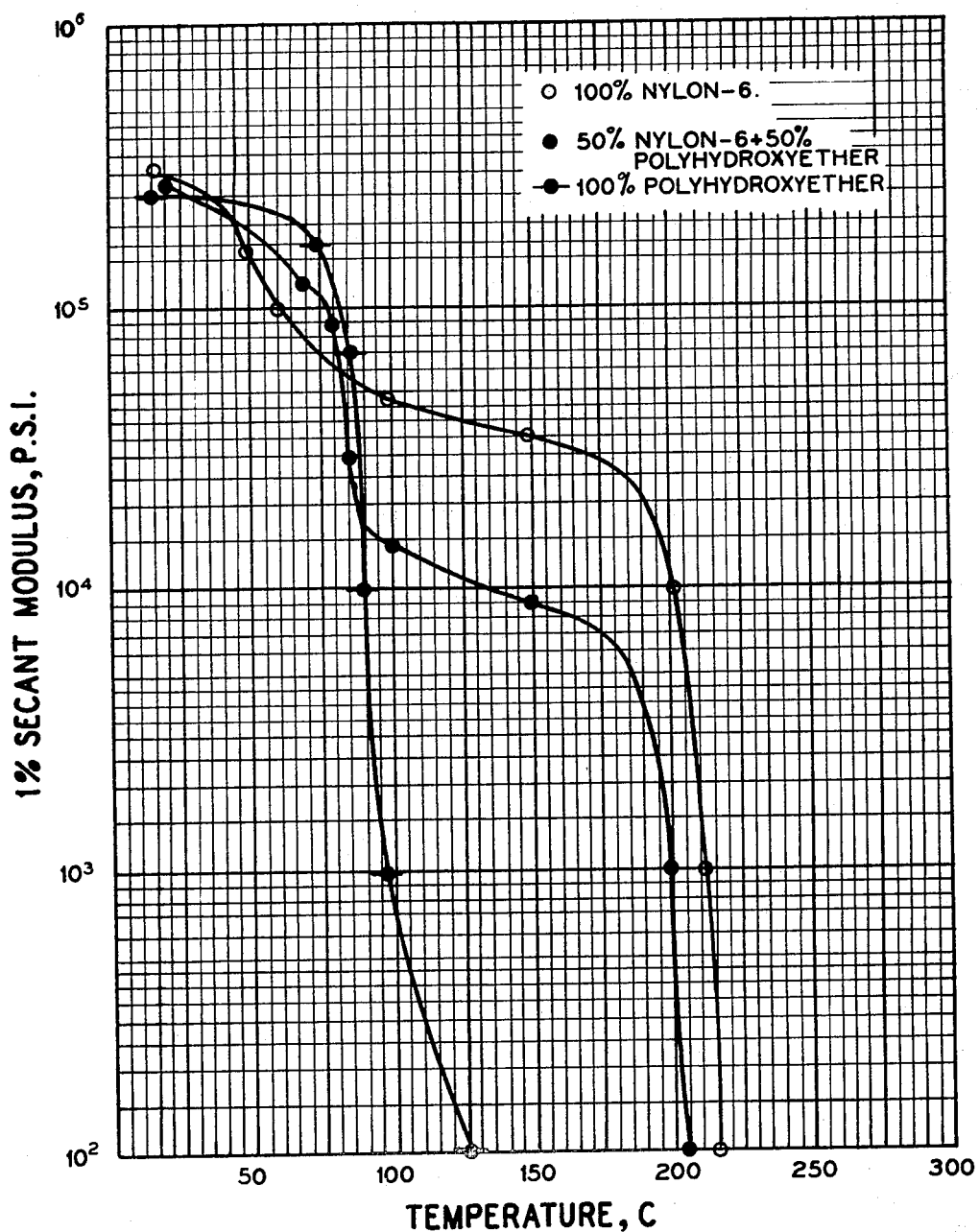

---

3,714,289
THERMOPLASTIC POLYHYDROXY ETHERS MODIFIED WITH POLYAMIDES
Donald L. Schober, Belle Mead, James E. McGrath, Somerville, and Markus Matzner, Edison, N.J., assignors to Union Carbide Corporation, New York, N.Y.
Filed Oct. 26, 1971, Ser. No. 192,196
Int. Cl. C08g 41/04, 45/12
U.S. Cl. 260—830 P
14 Claims

ABSTRACT OF THE DISCLOSURE

Blends of thermoplastic polyhydroxyethers, derived from bisphenol A and epichlorohydrin, with polyamides were prepared having superior environmental stress crack resistance over that of the polyhydroxyethers alone. The resultant blends are mechanically compatible and can be molded and blown into film form.

BACKGROUND OF THE INVENTION

This invention pertains to blends of thermoplastic polyhydroxy ethers with polyamides and more particularly to polyhydroxy ethers synthesized from bisphenol A (2,2-bis)p-hydroxyphenol(propane). Thermoplastic polyhydroxy ethers have many desirable physical and mechanical properties such as toughness, high tensile strength, high tensile modulus, and high gas impermeability, particularly to oxygen. Thermoplastic hydroxy ethers in addition are relatively easily formed by any of the conventional thermoplastic fabricated techniques, including cold forming, blow molding, extruding, compression molding and other methods known in the plastics art. Unfortunately, thermoplastic polyhydroxy ethers share the shortcoming of many other thermoplastic polymers, e.g., styrene polymers, in exhibiting lower environmental stress crack resistance upon exposure to packaged materials and solvents than it does in other environments.

While this property has been significantly improved by the addition of additives to the thermoplastic polyhydroxy ethers, it is often desirable to obtain a thermoplastic polyhydroxy ether modified with an other organic polymeric material in order to overcome environmental stress cracking without loss of mechanical properties. However, this is a difficult end to accomplish because it is generally recognized that polymers are incompatible with each other as revealed in such literature references as (Principles of Polymer Chemistry) by P. J. Flory, page 555, Cornell University Press, Ithaca, 1953 and Rubber Chemistry and Technology, vol. 41, No. 2, page 495 (1968). This phenomenon has been explained as being due to the fact that with large molecules, the entropy of mixing is small and usually insufficient to overcome the enthalpy contribution. Therefore, the free energy of mixing is positive, which results in an insoluble system, that is, each of two polymers in a blend is insoluble in the other. This phenomenon is exemplified in U.S. 3,324,313 wherein it is disclosed that bisphenol A polyhydroxy ether is incompatible with vinyl chloride-vinyl acetate copolymer, styrene, acrylonitrile copolymer, and polyethylene terephthalate.

SUMMARY OF THE INVENTION

It has therefore been unexpectedly found that mechanically compatible blends of:
(a) About 5 to about 50 parts by weight of thermoplastic polyhydroxyether having the formula:

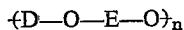

wherein D is the radical residuum of a dihydric phenol, E is a radical residuum of an epihalohydrin and $n$ is an integer which represents the degree of polymerization and has a value of at least 30; and
(b) About 95 to about 50 parts by weight of a normally solid polyamide selected from the group consisting of:

(1) 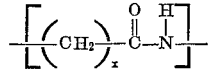

(2) 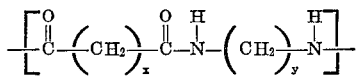

or (3) 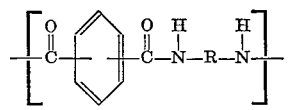

wherein $x$ and $y$ are integers having values of about 1 to about 12, and R is a divalent hydrocarbon radical having from 1 to about 12 carbon atoms therein.

The divalent hydrocarbon radical R can be aliphatic, either linear or branched, cycloaliphatic, or aromatic. Preferred linear aliphatic divalent radicals include methylene, ethylene, trimethylene, tetramethylene, pentamethylene, hexamethylene, decamethylene, dodecamethylene, and like radicals.

Exemplary branched aliphatic divalent radicals include propylene, ethylethylene, methyltetramethylene, ethylidene, propylidene and like radicals.

Representative cycloaliphatic divalent radicals are cyclopentylene, cyclohexylene, cycloheptylene, cyclopentylidene, cyclohexylidene, cycloheptylidene and like radicals.

Included within the definition of aromatic divalent radicals are such arylene radicals as o-phenylene, p-phenylene, m-phenylene radicals and lower alkyl substituted homologs thereof as well as naphthylene radicals and lower alkyl substituted homologs thereof.

DESCRIPTION OF THE INVENTION

While the degree of polymerization of the thermoplastic polyhydroxy ethers of this invention may be as low as about 30, it is preferred to be at least 80 and even more preferred that it be about 100.

The dihydric phenol contributing the phenol radical residuum, D, can be either a dihydric mononuclear phenol such as hydroquinone and resorcinol or a dihydric polynuclear phenol such as those having the general formula

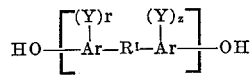

wherein Ar is an aromatic divalent hydrocarbon such as naphthylene and, preferably phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example,

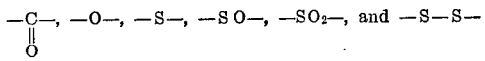

and divalent hydrocarbon radicals such as alkylene, alkylidene, cycloaliphatic, e.g., cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include, among others:

The bis-(hydroxyphenyl)-alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorphenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
bis(4-hydroxyphenyl)cyclohexylmethane,
1,2-bis-(4-hydroxyphenyl)-1,2-bis-(phenyl)-propane,
2,2-bis-(4-hydroxyphenyl)-1-phenyl-propane and the like;

Di(hydroxyphenyl)sulfones such as bis-(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone and the like;

Di(hydroxyphenyl) ethers such as bis-(4-hydroxyphenyl)-ether,
the 4,5'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxydiphenyl)-ether,
4,4'-dihydroxy-2,6-dimethoxydiphenyl ether,
4,4'-dihydroxy-2,5-diethoxydiphenyl ether,
and the like.

Also suitable are the bisphenol reaction products of 4-vinyl-cyclohexene and phenols, e.g. 1,3-bis(p-hydroxyphenyl)-1-ethylcyclohexane and the bisphenol reaction products of dipentene or its isomers and phenols such as 1,2 - bis(p-hydroxyphenyl)-1-methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

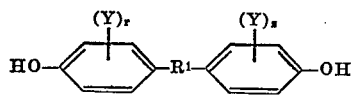

wherein Y and $Y_1$ are as previously defined r and z have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 9 carbon atoms.

Mixtures of dihydric phenols can also be employed and whenever the term "dihydric phenol" or "dihydric polynuclear phenol" is used herein mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus,

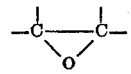

A monoepoxide contains one such oxirane group and provides a radical residuum E containing a single hydroxyl group; a diepoxide contains two such oxirane groups and provides a radical residuum E containing two hydroxyl groups. Saturated epoxides, by which term is meant diepoxides free of ethylenical unsaturation, i.e., $>C=C<$ and acetylenic unsaturation, i.e. $—C\equiv C—$, are preferred. Particularly preferred are halogen substituted saturated monoepoxides i.e. the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen

and the like.

Specific examples of monoepoxides include epichlorohydrins such as epichlorohydrin, epibromohydrin, 1,2-epoxy - 1 - methyl-3-chloropropane, 1,2-epoxy-1-butyl-3-chloropropane, 1,2 - epoxy-2-methyl-3-fluoropropane, and the like.

Illustrative diepoxides include diethylene glycol bis(3,4-epoxycyclohexane-carboxylate),
bis(3,4-epoxycyclohexylmethyl)adipate,
bis(3-,4-epoxycyclohexylmethyl)phthalate,
6-methyl-3,4-epoxycyclohexylmethyl 6-methyl-3,4-epoxycyclohexane carboxylate,
2-chloro-3,4-epoxycyclohexymethyl 2-chloro-3,4-epoxycyclohexanecarboxylate,
diglycidyl ether,
bis(2,3-epoxycyclopentyl)ether,
1,5-pentanediol bis(6-methyl-3,4-epoxycyclohexylmethyl) ether,
bis(2,3-epoxy-2-ethylhexyl)adipate,
diglycidyl maleate,
diglycidyl phthalate,
3-oxatetracyclo [4.4.0.1$^{7,10}$.0$^{2,4}$]undec-8-yl-2,3-epoxypropyl ether.
[4.4.0.1$^{7,10}$.0$^{2,4}$]undec-8-yl 2,3 epoxypropylether,
bis(2,3 epoxycyclopentyl)sulfone,
bis(3,4-epoxyhexoxypropyl)sulfone,
2,2'-sulfonyldiethyl bis(2,3-epoxycyclopentanecarboxylate),
3-oxatetracyclo[4.4.0.1$^{7,10}$.0$^{2,4}$]undec-8-yl 2,3 epoxybutyrate,
4-pentenal-di(6-methyl-3,4-epoxycyclohexylmethyl) acetal,
ethylene glycol bis(9,10-epoxystearate),
diglycidyl carbonate,
bis(2,3-epoxybutylphenyl)2-ethylhexyl phosphate,
diepoxydioxane,
butadiene dioxide, and
2,3-dimethyl dioxide.

The preferred diepoxides are those wherein each of the oxirane groups is connected to an electron donating substituent which is not immediately connected to the carbon atoms of that oxirane group.

Such diepoxides have the grouping

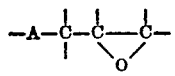

wherein is an electron donating substituent such as

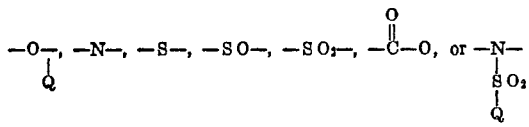

and Q is a saturated hydrocarbon radical such as an alkyl, cycloalkyl, aryl or aralkyl radical.

A single monoepoxide or diepoxide or a mixture of at least two monoepoxides or diepoxides can be employed in preparing thermoplastic polyhydroxyethers and the terms "monoepoxide" and "diepoxide" are intended to include a mixture of at least two monoepoxides or diepoxides, respectively.

The thermoplastic polyhydroxyether compositions of the invention can be prepared by any of the blending or mixing means conventionally used to mix or compound thermoplastics. For example, suitable techniques include codissolving and blending of solutions of the components, working in a Banbury mixer, a compounding extruder, or on a roll mill or in equivalent apparatus. Fluxing the composition components during a portion of the mixing in these apparatus is preferred to insure homogeneity of the final composition.

Melt flow of the thermoplastic polyhydroxy ethers was determined by weighing in grams the amount of thermoplastic polyhydroxyether which, at a temperature of 220° C. under a pressure of 44 p.s.i., flowed through an orifice having a diameter of 0.082 inch and a length of 0.315 inch over a 10 minutes period. Four such determinations were made and the average of the four determinations reported as decigrams per minute under a pressure of 44 p.s.i. at 220° C.

The thermoplastic polyhydroxyethers are preferably prepared by admixing from about 0.985 to about 1.015 moles of an epichlorohydrin (preferably epichlorohydrin) with one mole of a dihydric phenol together with about 0.6 to 1.5 moles of an alkali metal hydroxide, such as sodium hydroxide or potassium hydroxide generally in an aqueous medium at a temperature of about 10° to about 50° C. until at least about 60 mole percent of the epihalohydrin has been consumed. The thermoplastic polyhydroxyethers thus produced have reduced viscosities of at least 0.43, generally from about 0.43 to about 1 and preferably from about 0.5 to about 0.7. Reduced viscosity values were computed by use of the equation:

$$\text{Reduced viscosity} = \frac{t_s - t_o}{c \cdot t_o}$$

wherein:

$t_o$ is the efflux time of the solvent (tetrahydrofuran),
$t_s$ is the efflux time of the polyhydroxyether solution, and
$c$ is the concentration of the polyhydroxyether solution in terms of grams of polyhydroxyether per 100 ml. of tetrahydrofuran solution.

A typical preparation of thermoplastic hydroxyether for use in this invention is as follows. A closed reaction vessel equipped with a sealed stirrer, thermometer and reflux condenser was charged with the following:

| Compounds: | Amounts, parts |
|---|---|
| 2,2-bis(4-hydroxyphenyl)propane (0.5 moles) | 114.5 |
| Epichlorohydrin (99.1% pure) | 46.8 |
| Ethanol | 96.0 |
| Butanol | 10.0 |
| Sodium hydroxide (97.5% pure) | 22.6 |
| Water | 70.0 |

The above mixture was stirred at room temperature for 16 hours to accomplish the initial coupling reaction. The mixture was then heated at 80° C. for 1 hour. 60 milliliters of a 7:3 mixture of toluene:butanol was added. Heating of the mixture at 80° C. was continued for another 2 hours. There was then added an additional 50 parts of the 7:3 toluene:butanol mixture and 4.5 parts of phenol. The contents of the vessel was maintained at 80° C. (reflux) for 2.5 hours. Upon cooling, the reaction mixture was cut with 200 parts of the 7.3 toluene:butanol mixture. 100 parts of water was added and agitated with the contents of the vessel to dissolve salts present in the reaction mixture. The vessel contents were allowed to settle for 10 minutes during which time a lower brine phase formed. This lower phase was separated by decantation. The upper polymer solution containing phase was washed successively with two 160-part portions of water containing 4.5% butanol. The washed polymer solution was acidified by stirring the solution with a mixture of 1 part of 85% phosphoric acid with 100 parts of water (pH=2) for 1 hour. The upper polymer solution phase was again separated by decantation and water washed with 4 successive 200 part portions of water containing 4.5% butanol. The washed polymer was then coagulated in 1000 parts of isopropanol, filtered and dried. There was obtained a thermoplastic polyhydroxyether of 2,2-bis(4-hydroxyphenol) propane and epichlorohydrin having a melt flow of 7.0 decigrams per minute.

The preferred polyamides used in this invention include: nylon 6, nylon 66, nylon 610, nylon 11 and nylon 12. These are commercially available polymers and their methods of preparation are described in the Encyclopedia of Chemical Technology, vol. 10, pages 924–928, Interscience Publishers Inc., N.Y.C. (1953). Other polyamides which fall within the ambit of this invention include both those made from amino acids or the corresponding alicyclic lactams as well as those made from salts of diamines and dibasic acids.

Although about 5 to 50 parts of thermoplastic polyhydroxyether are used in conjunction with about 50 to 95 parts of polyamide it is preferred to use about 25 to 50 parts of polyhydroxyether and about 50 to 75 parts of polyamide.

The mechanical compatibility of the thermoplastic polyhydroxyethers and the polyamides is evinced by:

(1) Good mechanical properties—particularly tensile strength and elongation of the blends.

(2) Good permeability and stress-crack and chemical resistance of the blends.

(3) The fact that the blends can be blown into films.

In contrast incompatible polymer blends such as polystyrene-nylon 6 blends have poor mechanical properties and deficiencies of one component are not improved by the other component.

As shown in the accompanying figure the subject blend of thermoplastic polyhydroxyethers and polyamides are two phase systems as evinced by the typical modulus-temperature curves for such systems and yet these two polymers are unexpectedly mechanically compatible.

The compositions of this invention can be used as molding resins and in packaging film applications, since they are both easily molded and blown into films.

Conventional mixing equipment can be used for the preparation of the thermoplastic polyhydroxyethers and polyamides. Three procedures were used in preparing blend samples for the measurement of the properties presented infra. These methods included fluxing thermoplastic polyhydroxyether derived from bisphenol A and epichlorohydrin on a 2-roll mill at about 200° C. and then adding nylon 6 pellets and continuing their milling operation for about 5 to 10 minutes at which time a homogeneous mixture was obtained. A second blending method involved melting nylon 6 at 230° C. in an argon-purged laboratory Brabender apparatus. A thermoplastic polyhydroxyether derived from bisphenol A and epichlorohydrin was then added and mixed with the nylon 6 for 5 minutes. The apparatus was cooled and a homogeneous blend removed. The third method consisted of first mixing pellets of nylon 6 and thermoplastic polyhydroxyether derived from bisphenol A and epichlorohydrin in a jar mounted on a commercial roller. The blended pellets were then fed by a vibrascrew feeder to an argon-purged vented extruder having a length to diameter ratio of 36. Melt mixing at a maximum temperature of 240° C. followed by extrusion and pelletizing, afforded very well dispersed samples which possessed excellent mechanical properties. The nylon 6 used in these blending experiments was Plaskon 8201 sold by Allied Chemical Corporation.

The experiment is further described in the examples which follow. All parts and percentages are by weight unless otherwise specified.

EXAMPLES 1–3

Pellets of thermoplastic polyhydroxyether derived from bisphenol A and epichlorohydrin (commercially available Bakelite Phenoxy Resin PRNA–8000), and nylon 6 (Plaskon 8201) were mixed in one gallon jars in proportions sufficient to provide 25, 50 and 75% by weight of nylon 6 in the resultant blends. The jars were rolled for 5 minutes to thoroughly mix the pellets and the mixtures then dried at 80° C. for 24 hours under a pressure of about 15 millimeters before proceeding to the blending operation. The pellets, about 2 pounds for each blend, were then fed into a single-screw vented extruder (length/diameter= 36) by a vibrascrew feeder under an argon purge. The screw r.p.m. was 120 (200 p.s.i.) and the vacuum at the vent was 1 mm. Hg. The production rate was about 2 pounds per hour. The extrudate was cooled in a water bath and diced on a chopper. Each batch was dried at 80° C. for 24 hours under a pressure of 15 millimeters before examination of test specimens. The mechanical properties of these three blends were measured on plaques which had been compression molded in a press at 250° C. The tensile strength, tensile modulus, elongation, pendulum impact strength, $T_g$, and $T_2$ were measured for each of the three blends and compared with controls containing 100% polyhydroxyether as Control A and 100% nylon 6 as Control B. These data are shown in Table I.

Glass transition temperature ($T_g$) also referred to as second order phase transition temperature is here defined as the inflection temperature found by plotting the resilience (recovery from 1% elongation) of a film, ranging in thickness of from 3 to 15 mils against the temperature. A detailed explanation for determining resilience and inflection points can be found in an article by A. Brown, Textile Research Journal, vol. 25, 1955 on page 891.

$T_2$ is defined as the temperature which the tensile modulus (measured in accordance with ASTM D–256–56) reaches 100 p.s.i.

Tensile strength, tensile modulus secant modulus and elongation at break were determined in conformity with ASTM D–638–60. The pendulum impact strengths which are an indication of toughness were determined in conformity with ASTM D–256–56.

The environmental stress aging characteristics of these three thermoplastic polyhydroxyether/nylon 6 blends were evaluated by measuring the effect of 4 organic solvents on the tensile strength of the plaques made therefrom. These results are presented in Table II.

The effect of these same organic solvents on elongation at break is delineated in Table III.

The permeability and moisture vapor transmission (MVT) data of these polyhydroxyethers/nylon 6 blends is presented in Table IV. It is unexpected that the blends exhibit lower permeability data than the calculated values based on a single averaging of each of the two blend components.

TABLE II.—EFFECT OF THE ORGANIC ENVIRONMENT OF THE TENSILE STRENGTH [1]

| Example No. | Percent Nylon 6 | Tensile strength, p.s.i. | | | |
|---|---|---|---|---|---|
| | | Ethyl acetate | Ethanol | Acetone | Trichloroethylene |
| Control A [2] | 0 | 2,320 | 2,080 | 4,100 | Rupture [3]. |
| 1 | 25 | 3,850 | 2,950 | 4,255 | Do. |
| 2 | 50 | 6,575 | 7,100 | 7,050 | 6,650. |
| 3 | 75 | 5,900 | 6,350 | 4,700 | 7,250. |
| Control B | 100 | 6,420 | 7,350 | 6,500 | 6,950. |

[1] A cotton swab saturated with the organic agent was wrapped around the test specimen just prior to the tensile measurement.
[2] Thermoplastic polyhydroxyether alone.
[3] Specimen ruptured before tensile value could be determined.

TABLE III.—EFFECT OF THE ORGANIC ENVIRONMENT ON THE ELONGATION AT BREAK [1]

| Example No. | Percent Nylon 6 | Elongation at break, percent | | | |
|---|---|---|---|---|---|
| | | Ethyl acetate | Ethanol | Acetone | Trichloroethylene |
| Control A [2] | 0 | 1 | 1 | 1 | |
| 1 | 25 | 2 | 2 | 2 | |
| 2 | 50 | 20 | 12 | 8 | 20 |
| 3 | 75 | 87 | 45 | 35 | 35 |
| Control B | 100 | 40 | 90 | 40 | 45 |

[1] Same technique as in footnote (1), Table II.
[2] Thermoplastic polyhydroxyether alone.

TABLE I.—MECHANICAL PROPERTIES OF POLYHYDROXYETHER-NYLON 6 BLENDS

| Example No. | Nylon 6, weight percent | Tensile, p.s.i. | | Elongation, percent | Pendulum impact, strength ft. lbs./in.$^3$ | $T_g$, °C. | $T_2$, °C |
|---|---|---|---|---|---|---|---|
| | | Modulus | Strength | | | | |
| 1 | 25 | 313,000 | 8,440 | 18 | 60 | 85 | 185 |
| 2 | 50 | 314,000 | 9,140 | 205 | 80 | 86 | 210 |
| 3 | 75 | 338,000 | 9,200 | 136 | 73 | 85 | 220 |
| Control A [a] | 0 | 250,000 | 9,800 | 30 | 115 | 93 | 100 |
| Control B | 100 | 306,000 | 10,000 | 110 | 120 | 60 | 220 |

[a] Thermoplastic polyhydroxyether (alone).

TABLE IV.—PERMEABILITY AND MOISTURE VAPOR TRANSMISSION

| Example No. | Percent Nylon 6 | Permeability, cc. mil/100 in.$^2$ 24 hours atmospheric | | | MVT, grams mil/100 in.$^2$ 24 hours | |
|---|---|---|---|---|---|---|
| | | $O_2$ | $N_2$ | $CO_2$ | Calculated [1] | Experimental |
| Control A [2] | | 10 | 1.5 | 55 | 3.43 | 3.43 |
| 1 | 25 | 6.2 | 1.2 | 25 | 6.67 | 3.83 |
| 2 | 50 | 3.4 | .75 | 11.5 | 9.91 | 5.24 |
| 3 | 75 | 2.6 | .72 | 7.0 | 13.14 | 7.49 |
| Control B | 100 | 2.3 | .55 | 7.7 | 16.38 | 16.38 |

[1] The "calculated" values were obtained by assuming that the parameter follows simple additivity rules based on the weight fractions of the constituents.
[2] Thermoplastic polyhydroxyether alone.

EXAMPLES 4 AND 5

Blown films of two blends containing 75 and 50% respectively of nylon 6 were prepared using a 1" single-screw extruder having a length/diameter ratio of 14 and a 1" Egan die. The screw r.p.m. was 30 and the take-off speed was 10 feet of film per minute. The gauge of the film thus obtained was 1 to 2 mils. The mechanical and permeability properties of these two films were measured and the results presented in Table V.

The dart impact data presented in Table V were obtained by the method described in ASTM D-1709-59T.

Gas permeability data were obtained in conformity with the test method described in ASTM D-1434-58.

Moisture vapor transmission data were obtained in conformity with the test method described in ASTM E-96-53T.

TABLE V.—PROPERTIES OF BLOWN FILMS

| Property | Example 4, 50% weight nylon | | Example 5, 75% weight nylon | |
|---|---|---|---|---|
| | Machine direction | Transverse direction | Machine direction | Transverse direction |
| Tensile modulus, p.s.i. | 320,000 | 320,000 | 312,000 | 273,000 |
| Yield strength, p.s.i. | 7,580 | 6,530 | 7,180 | 4,980 |
| Tensile strength, p.s.i. | 8,730 | 6,500 | 9,910 | 9,810 |
| Yield elongation, p.s.i. | 3.5 | 3.0 | 4.5 | 5.3 |
| Elongation at break, percent | 214 | 35 | 285 | 274 |
| Pendulum impact, ft. lbs./in.³ | 53 | 53 | 71 | 75 |
| Tensile impact | 153 | 158 | 628 | 475 |
| Dart impact, grams | 110 | 110 | 387 | 387 |
| Permeability, cc. mil/100 in.² 24 hours atmospheric pressure: | | | | |
| $O_2$ | 4.25 | 4.25 | 2.86 | 2.86 |
| $N_2$ | 0.92 | 0.92 | 0.62 | 0.62 |
| $CO_2$ | 7.35 | 7.35 | 5.00 | 5.00 |
| MVT, grams mil/100 in.²/24 hours | 8.95 | 8.95 | 7.96 | 7.96 |

EXAMPLE 6

When Example 1 is repeated with the exception that the thermoplastic polyhydroxyether derived from bisphenol A and epichlorohydrin was replaced by one derived from hydroquinone and epichlorohydrin, comparable blends are obtained.

EXAMPLE 7

When Example 1 is repeated with the exception that the thermoplastic polyhydroxyether derived from bisphenol A and epichlorohydrin is replaced by one derived from 1,1-bis(4-hydroxyphenyl)cyclohexane and epichlorohydrin, comparable blends are obtained.

EXAMPLE 8

When Example 1 is repeated with the exception that the nylon 6 is replaced by nylon 610, comparable blends are obtained.

EXAMPLE 9

Example 1 was repeated with the exception that the nylon 6 was replaced by an equivalent amount of Trogamide T (a polyamide prepared from terephthalic acid and a branched chain aliphatic diamine sold by Dynamit Nobel Co.). Comparable blends were obtained. For example compression molded plaques prepared from the resultant blends exhibited a tensile modulus of 310,000 p.s.i., a tensile strength of 9,200 p.s.i., a 30% elongation and a pendulum impact strength of 110 ft. lbs./in.³.

It will be appreciated by those skilled in the art that small amounts of additives may be employed in the blends of this invention, as for example, dyes, colorants, antioxidants, heat stabilizers, ultraviolet light absorbers, plasticizers, fillers or extenders, slip additives, anti-block agents, and the like.

Although the invention has been disclosed in its preferred form with a certain degree of particularlity, it is understood that the present disclosure of the preferred forms have been made only by way of example and numerous changes may be resorted to without departing from the spirit and the scope of the invention.

What is claimed is:

1. Mechanically compatible blends of:
   (a) about 5 to about 50 parts by weight of a thermoplastic polyhydroxyether having the formula:

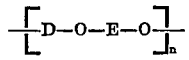

wherein D is the radical residuum of a dihydric phenol, E is a radical residuum of an epihalohydrin and $n$ is an integer which represents the degree of polymerization and has a value of at least about 30, with
   (b) about 95 to about 50 parts by weight of a normally solid polyamide selected from the group consisting of:

(1) 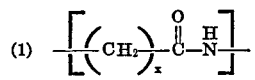

(2) 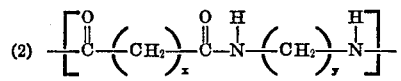

or (3) 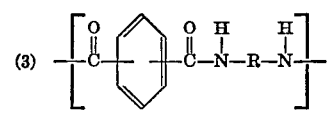

wherein $x$ and $y$ are integers having values of about 1 to about 12, and R is a divalent hydrocarbon radical having about 1 to about 12 carbon atoms therein.

2. The blend claimed in claim 1 wherein D is the radical residuum of a bis(4-hyroxyphenyl)alkane.

3. Blend claimed in claim 2 wherein the bis-(4-hydroxyphenyl)alkane is 2,2-bis(4-hydroxyphenyl)propane and $n$ is at least about 80.

4. Blend claimed in claim 1 wherein the epihalohydrin is epichlorohydrin.

5. Blend claimed in claim 1 wherein the polyamide has the formula:

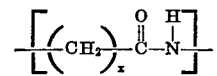

6. Blend claimed in claim 5 wherein $x$ is 5.

7. Blend claimed in claim 1 wherein the polyamide has the formula:

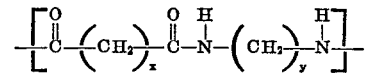

8. Blend claimed in claim 7 wherein $x$ is 4 and $y$ is 6.

9. Blend claimed in claim 7 wherein $x$ is 4 and $y$ is 10.

10. Blend claimed in claim 1 wherein the polyamide has the formula:

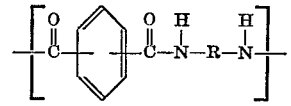

11. Blend claimed in claim 1 wherein the polyamide has the formula:

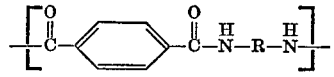

12. Blend claimed in claim 11 wherein R is branched chain divalent aliphatic radical.

13. Blend claimed in claim 1 wherein the dihydric phenol is hydroquinone.

14. Blend claimed in claim 1 wherein the dihydric phenol is 1,1-bis(4-hydroxyphenyl)cyclohexane.

(References on following page)

References Cited

UNITED STATES PATENTS

| | | | |
|---|---|---|---|
| 3,177,090 | 4/1965 | Bayes | 260—831 |
| 3,374,286 | 3/1968 | Hicks | 260—830 P |
| 3,384,679 | 5/1968 | Stetz | 260—858 |
| 3,431,238 | 3/1969 | Borman | 260—857 R |
| 3,522,326 | 7/1970 | Bostick | 260—857 R |
| 3,655,822 | 4/1972 | McGrath | 260—857 R |
| 3,657,385 | 4/1972 | Matzner | 260—857 R |

PAUL LIEBERMAN, Primary Examiner

U.S. Cl. X.R.

260—47 EP, 857 R